(12) United States Patent
Montano (10) Patent No.: US 12,453,441 B2
(45) Date of Patent: Oct. 28, 2025

(54) COMPACTABLE AND PORTABLE GRILL APPARATUS

(71) Applicant: Nevin D Montano, Albuquerque, NM (US)

(72) Inventor: Nevin D Montano, Albuquerque, NM (US)

( * ) Notice: Subject to any disclaimer, the term of this patent is extended or adjusted under 35 U.S.C. 154(b) by 363 days.

(21) Appl. No.: 18/144,014

(22) Filed: May 5, 2023

(65) Prior Publication Data

US 2023/0355034 A1 Nov. 9, 2023

Related U.S. Application Data

(60) Provisional application No. 63/338,768, filed on May 5, 2022.

(51) Int. Cl.
*A47J 37/07* (2006.01)
*F24C 3/14* (2021.01)

(52) U.S. Cl.
CPC ....... *A47J 37/0763* (2013.01); *A47J 37/0713* (2013.01); *F24C 3/14* (2013.01)

(58) Field of Classification Search
CPC ...... F24C 3/14; A47J 37/0713; A47J 37/0763; A47J 2037/0777
See application file for complete search history.

(56) References Cited

U.S. PATENT DOCUMENTS

| | | | | |
|---|---|---|---|---|
| 5,884,553 A | * | 3/1999 | Morris | F24C 3/027 126/41 R |
| 5,954,044 A | * | 9/1999 | Schmidt | F16K 1/523 126/41 R |
| 2020/0363068 A1 | * | 11/2020 | Gauss | F24C 3/085 |
| 2021/0372626 A1 | * | 12/2021 | Kim | F24C 15/107 |

FOREIGN PATENT DOCUMENTS

| | | | |
|---|---|---|---|
| CN | 202858875 | * | 4/2013 |
| KR | 20210000068 | * | 1/2021 |

* cited by examiner

*Primary Examiner* — Alfred Basichas
(74) *Attorney, Agent, or Firm* — Luis M. Ortiz; Kermit D. Lopez (57) ABSTRACT

A compactible and portable and apparatus can be implemented in the form of free-standing portable propane fueled cooking device, which utilizes two support panels connected rotatably connected at their mid-section to support scissor-like action while deploying or closing the two support panels and a burner support panel that is deployable between the two support panels to support a burner and a cooking surface. The device permits use of a fuel source such as a standard propane tank. This design creates a very compact unit because the first and second support panels, the burner support panel and the burner and flame controller can be compacted into a flat profile for easy transport.

20 Claims, 8 Drawing Sheets

COMPACTABLE AND PORTABLE GRILL APPARATUS

INVENTION PRIORITY

The present application is a continuation of provisional patent application No. 63/338,768 filed May 5, 2023, entitled "COMPACTABLE AND PORTABLE GRILL APPARATUS", which is herein incorporated by reference in its entirety.

TECHNICAL FIELD

Embodiments are generally related to grill devices and systems. Embodiments are also related to compactable portable grill devices.

BACKGROUND OF THE INVENTION

U.S. Pat. No. 7,918,220 issued Apr. 5, 2011 and U.S. Pat. No. 8,397,707 issued Mar. 19, 2013, by the present inventor and entitled "Portable and Compact Grill Apparatus" are herein incorporated by reference.

It is a common practice to barbecue steaks, chops, hot dogs, and hamburgers on the grill over a charcoal fire. More recently, the outdoor cookout has begun to include other foods such as those best cooked in a cooking utensil known as a "wok" or "disk". The use of the wok involves cooking techniques incorporating a minimum amount of fats and oils. At times vegetables and meats are cooked for a very short time at high heats. The typical stir-fly recipe calls for a cooking time of less then five minutes. Such rapid cooking combined with the use of small quantities of fat provides substantial health benefits because less fat is absorbed in the food compared with traditional Western style frying. In addition, the wok style of cooking tends to seal the flavor into the food, rendering it more appealing to the palate.

The wok can be easily cleaned and readily reusable for cooking several items on the same menu. The rounded smooth metal surface may be wiped out or dumped for cleaning with little or no residue. Although the wok has many culinary advantages because of its shape, it has fundamental instability problems because of its generally hemispherical shape and relatively small surface on which to rest. The wok was originally developed to be placed directly on hollowed-out sections of coals on the ground and/or on rings with a wide base fire built below. The wok does not adapt well to cooking on modern ranges and as a result a number of devices have been suggested as a substitute for the above mentioned hollowed-out section of coals on the ground.

Figure 1A:
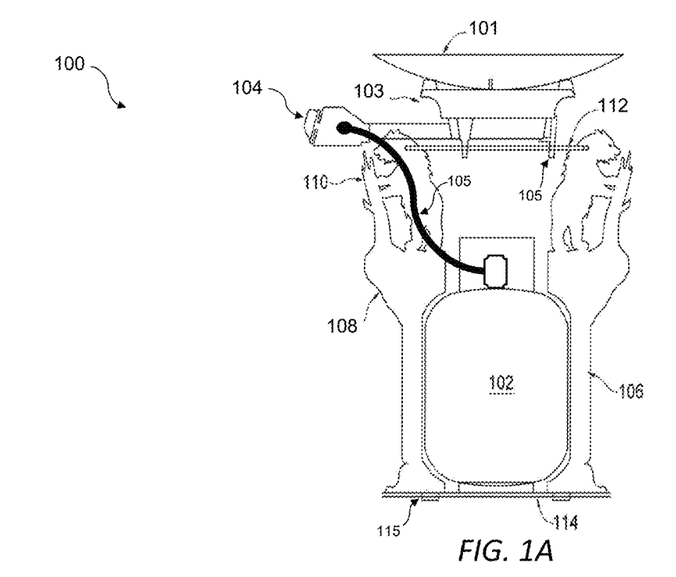
FIG. 1A, FIG. 1B, FIG. 1C and FIG. 1D illustrate side and top views of a prior art portable and compact grill apparatus.
Figure 1B:
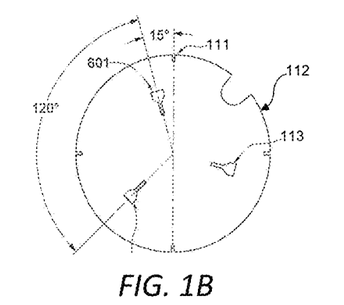
Figure 1C:
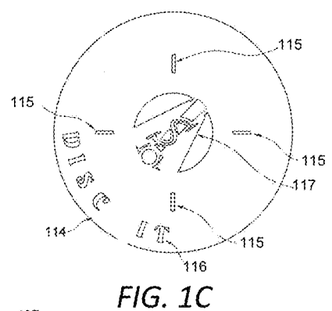
Figure 1D:
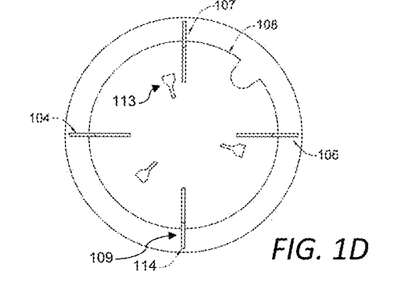
Figure 2:
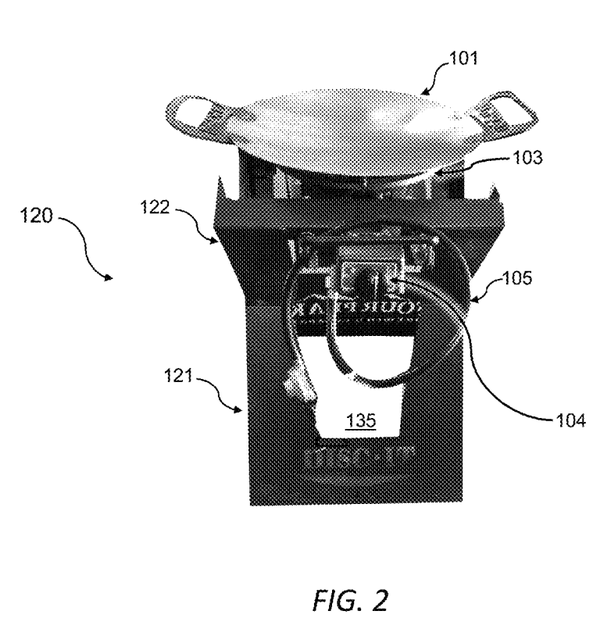
FIG. 2 illustrates a front top view of a compactable and portable grill apparatus, in accordance with a preferred embodiment.

Referring to FIG. 1A-D, labeled as prior art, shown is a design for a portable and compact grill apparatus 100. FIG. 1A illustrates a side view of a portable and compact grill apparatus 100 that includes a burner 103 and a cooking surface 101 (e.g., a Wok-shaped cooking surface, or disk). The burner 103 is typically connected to a fuel source 102 (i.e., removable propane tank) by a hose 105. Temperature on the cooking surface 101 is regulated by a flame controller 104, which enables adjustment of the flame height (and thereby the heat) from the burner 103 onto the cooking surface 101. The apparatus 100 shown provides a top plate 112, which can support the burner 103, and the cooking surface 101 (e.g., a wok) as it sits atop the burner 103. A top view of the top plate 112 is illustrated in FIG. 1B. The top plate 112 can also connect to support legs 104/106 and 107/109 (shown in FIG. 1D), and the legs are further supported by bottom plate 114. FIG. 1C illustrates a top view of the bottom plate 114, and four slots 115 formed therein to accept tab extensions at the bottoms of the legs 104/106/107/109. FIG. 1D illustrates a top view of top plate 108 positioned over bottom plate 109 with legs 104/106/107/109 positioned within slots 111 and 115 of both plates 112/114, respectively, thereby connected them and creating a four-legged support for the burner 103 and cooling surface 101, and also space therebetween for the fuel source 102. Fuel source 102 is shown located between the plates 112/114 as shown in FIG. 1A, and it would also be surrounded by all four legs 104/106/107/109 and would rest on top of the bottom plate 109 at location 117. Burner 103, would rest within slots 113 of top plate 112. This apparatus 100 illustrated in FIG. 1A-1D is a very efficient design, yet still requires a fair amount of effort to transport it once it is fully assembled.

Both propane tanks and grills such as the one described with reference to FIGS. 1A-D are great, but it can be difficult to move them to remote locations (e.g., campsites) for their use. What is needed are more compact and transportable designs for grills, and in particular a cooking apparatus that can support a wok or disk (as well as other cooking surfaces) when cooking in remote locations.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore, one aspect of the present invention to provide for an improved compactable and portable grill apparatus.

The aforementioned aspects and other objectives and advantages can now be achieved as described herein. A compactable and portable grill apparatus is disclosed, which can be implemented in the form of two-part support system that include a first support frame hingedly connected at its midsection to a midsection of a second support frame, and the two support frames can be collapsed towards and/or into each other to provide a flat profile for portability, in accordance with an embodiment. This two-part support system is provided in a scissor-like design wherein the first support panel is joined at its midsection to the second support panel and can be closed flat against each other for transport, or opened apart to provide sturdy ground contact and support when in use for cooking at remote locations that it may be moved to for use (e.g., campsites).

In accordance with another embodiment, when deployed, the two-part support system supports a hinged and spring-handle controlled burner support panel. A burner can be mounted on a burner support panel that can be hingedly connected near the top of the first support at a first end of the burner support panel, and can be swung upward and connected by spring-loaded posts located at the opposite side of the burner support panel in holes located near the top of the second support frame. The spring-loaded posts can be manipulated by an integrated handle also located at a second end of the burner. The posts can interface with post receiving holes formed in the second support by manipulation of the spring handle. When fully deployed the first and second support panels are in contact with the ground at their respective bottom ends, and the burner panel is supporting a burner in a horizontal position between the top portions of the first and second support panels and can be locked in the horizontal position by its hinge connection to the first support and locking of the spring-loaded posts within holes formed in the second support panel. A wok can then be placed on top of the burner supported by the burner support panel.

In accordance with another embodiment, legs, roller or levelers, or any combination thereof, can be mounted to the bottoms of the first and second support panels.

A fuel source can be connected to the burner via a hose. The burner can include a flame adjustment to control the amount of flame that is placed in contact with the wok from the burner.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

FIGS. 2-17 illustrate a compactible and portable grill apparatus 120, in accordance with various embodiments. The compactible and portable grill apparatus 120 can include a burner 103 a flame controller 104, and a hose 105 that can connect the flame controller 104 and burner 103 to a fuel source such as a propane tank shown in FIG. 1. The burner can support a cooking surface 101 (such as the disk-like wok depicted in the drawings). The compactible and portable grill apparatus 120 can include a two-part support system that includes a first support panel 121 connected to a second support panel 122 at their midsections 123/124 in a manner that allows rotational movement. The connection can be provided by holes in each panel at the midsections and moveably or loosely secured by screws and bolts. Other fasteners that support rotational movement of the panels with respect to each other (e.g., scissor-like movement) can be considered.

When fully deployed, the top portion of the first support panel 121 can be separated from the top portion of the second support panel, thereby causing the lower portion of each panel to separate (similar to how scissor handles and cutter sections are separated, thereby opening the cutting portions of each handle) and create ground-contact support. A burner support panel 130 can then be placed in a deployed (upright-horizontal) position between and near the top of the first/second support panels 121/122.

A first end of the burner support panel can be hingedly connected by at least one hinge 133 (see FIG. 10E) to the first support panel 121. The second end of the burner support panel 122 can include a spring-loaded locking mechanism that includes a handle 126 that can be pulled on to move at least one retaining post 129 into or out of at least one hole 128 formed near the top of the second support panel 122. At least one spring 127 can keep the at least one retaining post 129 secured within the hole 128 and thereby maintaining the burner support panel 130 in a horizontal position between the first and second support panels 121/122. The posts can therefore be considered, spring-loaded. The second end of the burner support panel 130 can be moved by upward rotation at the hinge 133 into position in the second support panel via passage through a port hole 135 formed in the lower portion of the first support panel 121.

To deploy the burner support panel 130, it can be swung upward from its stowed position within the first support panel 121 that it is hingedly connected to by at least one hinge 133, and a user 140 can pull on the handle 126 to retract the at least one retaining post 129 against at least one spring 127 (i.e., spring-loaded posts). When the at least one post is aligned with the at least one hole 128, then the user 140 can release the handle 126 thereby allowing the at least one post to enter the at least one hole and retain the burner support panel in a horizontal position between the first/second support panels 121/122.

When use of the compactible and portable grill apparatus 120 is complete and it must be recovered for transport, a user 140 can pull on the handle 126 to retract the at least one post from the at least one hole 128. Once retracted, the user 40 can rotate the burner support panel 130 downward through the port hole 135 and flat against the first support panel 121. Then the top of the first support panel 121 can be pressed towards the top of the second support panel 122 (or vise-a-vis, or simultaneously) to collapse them together in a flat transportable profile. The hose 105 can be tucked into an opening 135 formed in the second support panel 122. A handle 125 can be mounted the second support panel 122 (or the first support panel 121, depending on which one has an exposed side upon closure) to that the compactible and portable grill apparatus 120 can be easily carried.

More than one retaining post 129 and spring 127 can be utilized in association with the handle 126. The burner 103 can be mounted on a burner support panel 130 that can be hingedly connected near a top of the first support panel 121 at a first end of the burner support panel 130, and can be swung upward and connected by spring-loaded posts 129 located at the opposite side of the burner support panel 130 in holes 128 located near a top of the second support frame 122. The spring-loaded posts 129 can be manipulated by a handle 126 also located at a second end of the burner support panel 130 near the flame controller 104. The posts 129 can interface with post receiving holes 128 formed in the second support by manipulation of the spring handle. When fully deployed the first and second supports 121/122 are in contact with the ground and the burner support panel 130 can support a burner 103 in a horizontal position between the top portions of the first and second support panels 121/122 and can be locked in the horizontal position by its hinge 133 connection to the first support 121 and the locked posts 129 in holes 128 formed in the second support panel 122. A wok 101 can then be placed on top of the burner 103 supported by the burner support panel 130.

Figure 3:
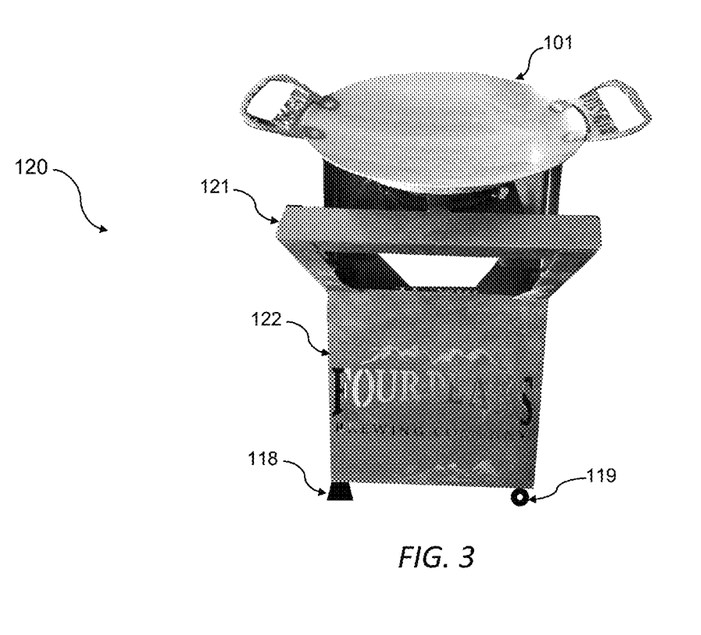
FIG. 3 illustrates a back top view of the compactable and portable grill apparatus depicted in FIG. 2, in accordance with a preferred embodiment.
Figure 4:
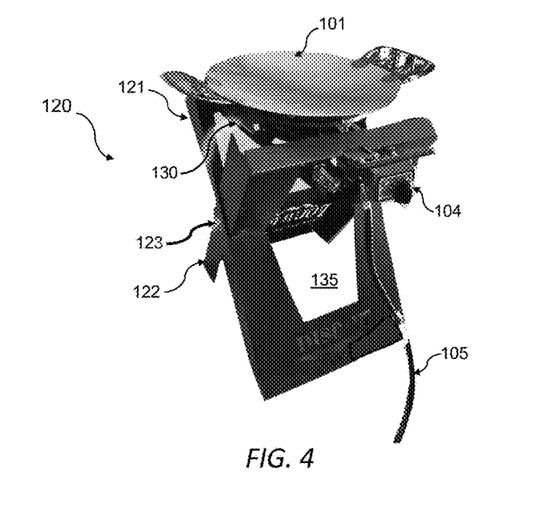
FIG. 4 illustrates a front left top view of the compactable and portable grill apparatus depicted in FIG. 2, in accordance with a preferred embodiment.
Figure 5:
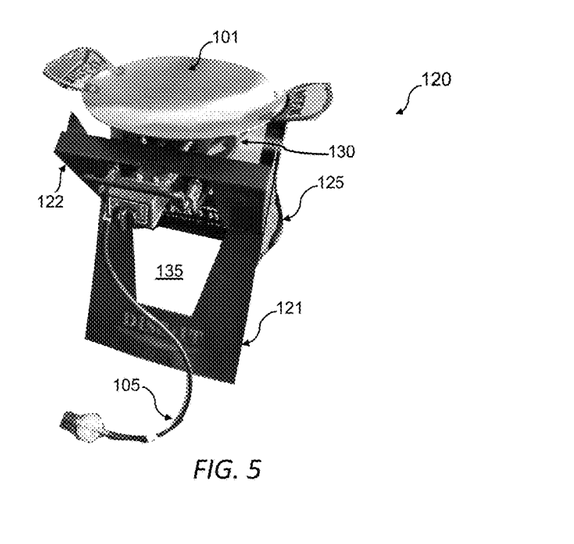
FIG. 5 illustrates a front right top view of the compactable and portable grill apparatus depicted in FIG. 2, in accordance with a preferred embodiment.
Figure 6:
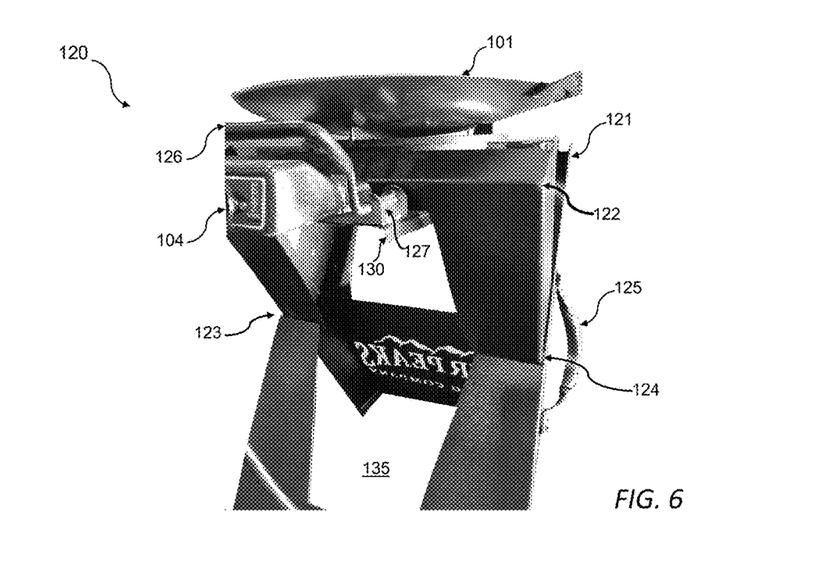
FIG. 6 illustrates front right close-up view from FIG. 5 of the spring-loaded locking mechanism and handle associated with the burner support panel and burner for the compactable and portable grill apparatus depicted in FIG. 2, in accordance with a preferred embodiment.
Figure 7:
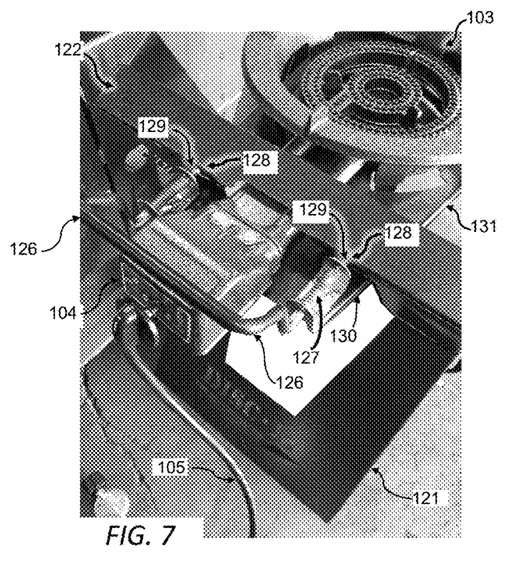
FIG. 7 illustrated a front right top close-up view of the compactable and portable grill apparatus depicted in FIG. 2, in accordance with a preferred embodiment.
Figure 8:
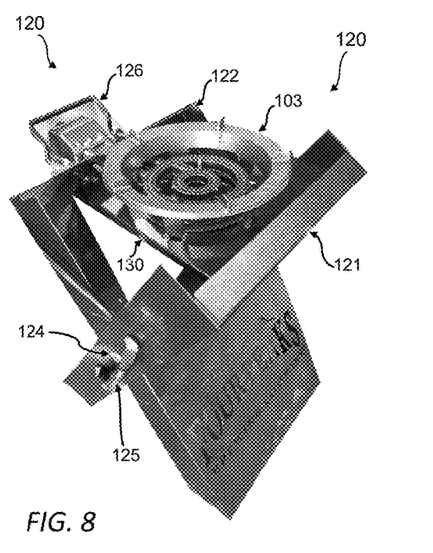
FIG. 8 illustrates a back left top view of the compactable and portable grill apparatus depicted in FIG. 2, in accordance with a preferred embodiment.
Figure 9:
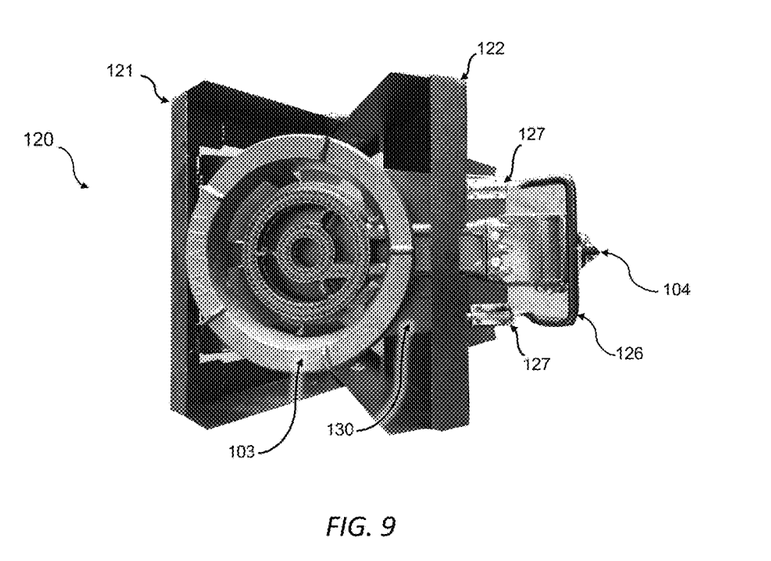
FIG. 9 illustrates a top view of the compactable and portable grill apparatus depicted in FIG. 2, in accordance with a preferred embodiment.
Figure 10A:
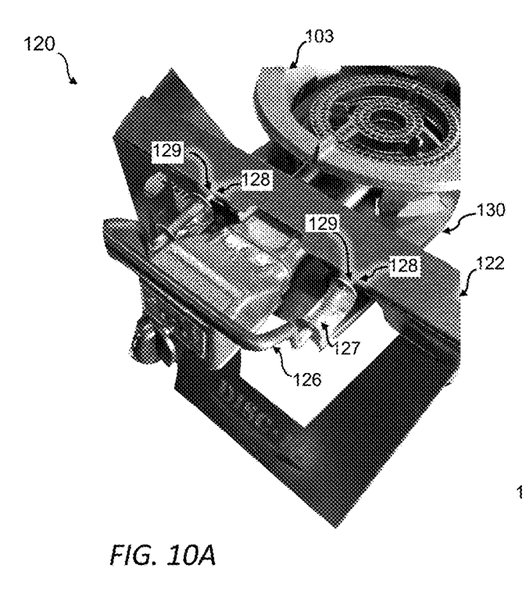
FIGS. 10A-F illustrate a close-up top right view of the compactable and portable grill apparatus depicted in FIG. 2 as various steps of a user collapsing the spring-loaded and locked burner support panel of the compactable and portable grill apparatus, in accordance with a preferred embodiment.
Figure 10B:
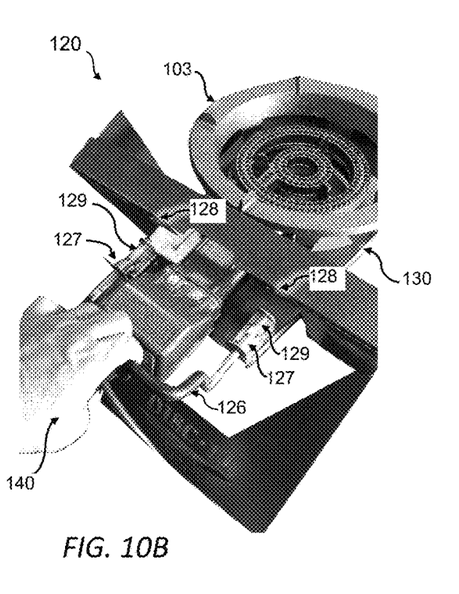
Figure 10C:
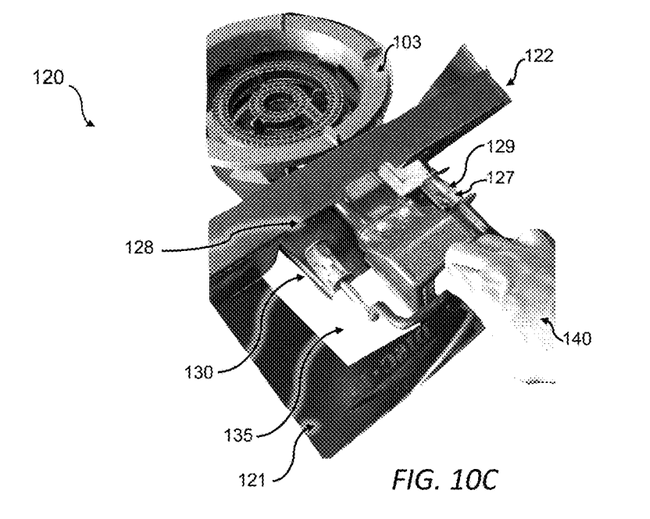
Figure 10D:
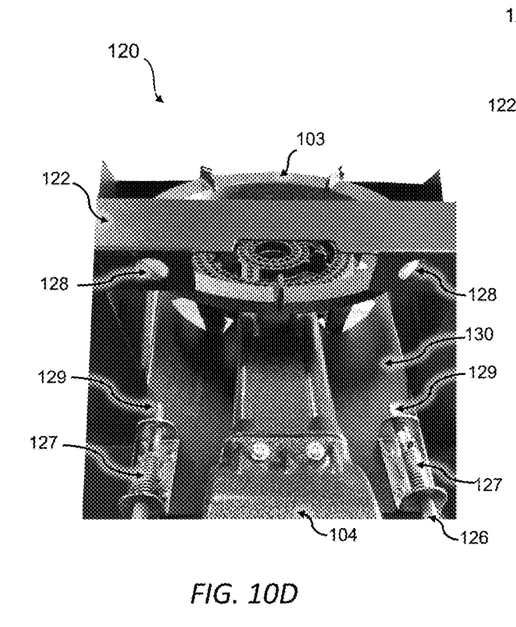
Figure 10E:
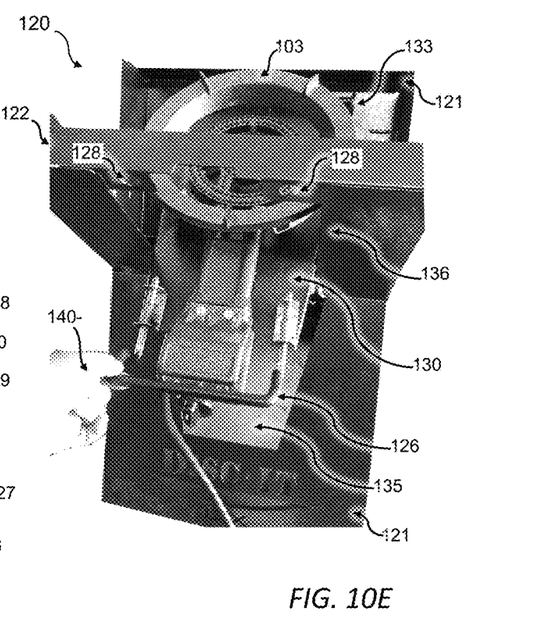
Figure 10F:
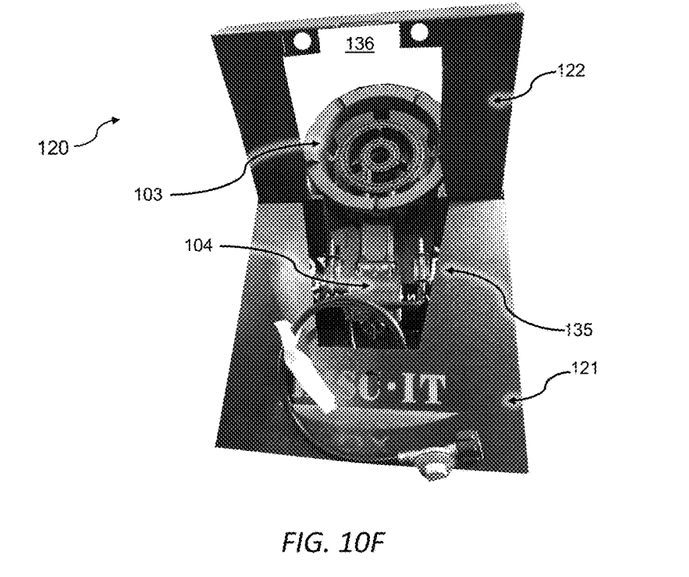
Figure 11:
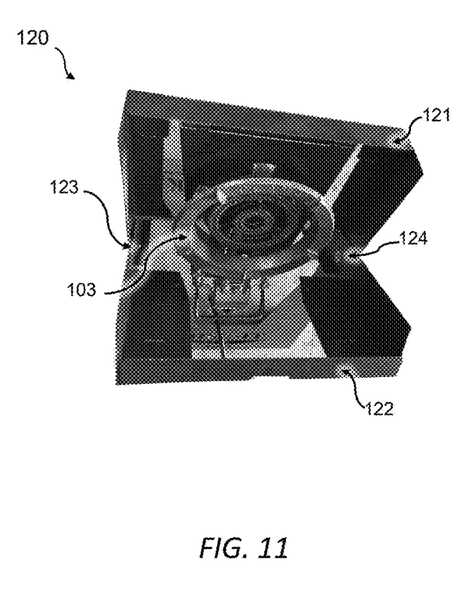
FIG. 11 illustrates a top view of the compactable and portable grill apparatus depicted in FIG. 2 with the burner support panel in a lowered position prior to closing first support panel against second support panel, in accordance with a preferred embodiment.
Figure 12:
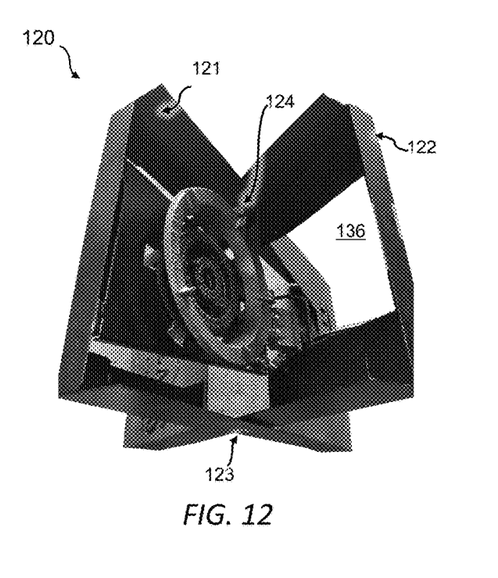
FIG. 12 illustrates a top left side view of the compactable and portable grill apparatus depicted in FIG. 11, in accordance with a preferred embodiment.
Figure 13:
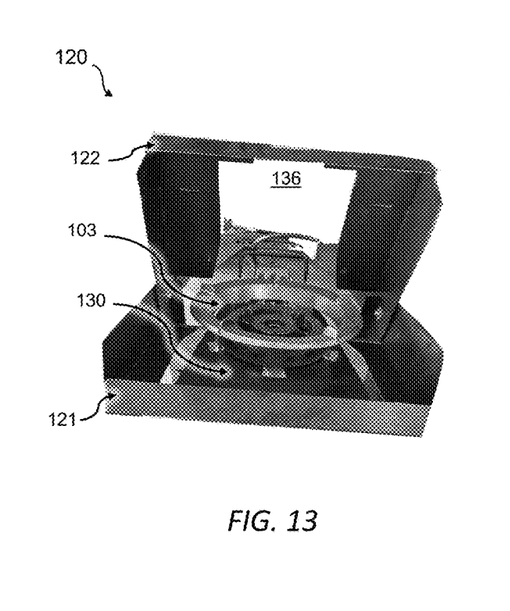
FIG. 13 illustrates a top rear view of the compactable and portable grill apparatus depicted in FIG. 11, in accordance with a preferred embodiment.
Figure 14:
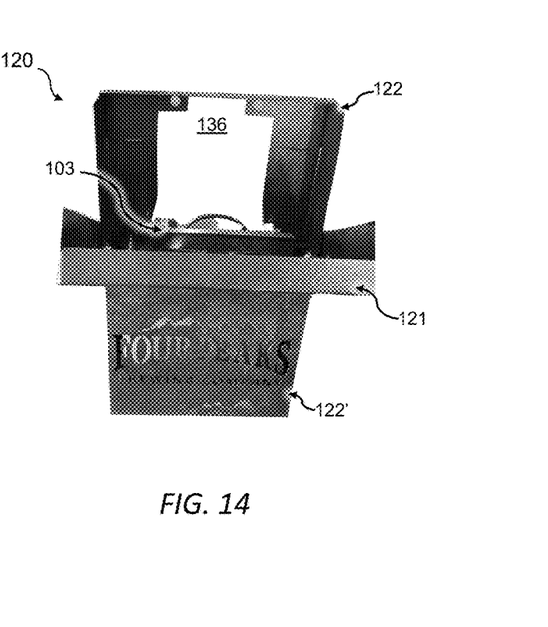
FIG. 14 illustrates all alternate rear top view of the compactable and portable grill apparatus depicted in FIG. 11, in accordance with a preferred embodiment.
Figure 15:
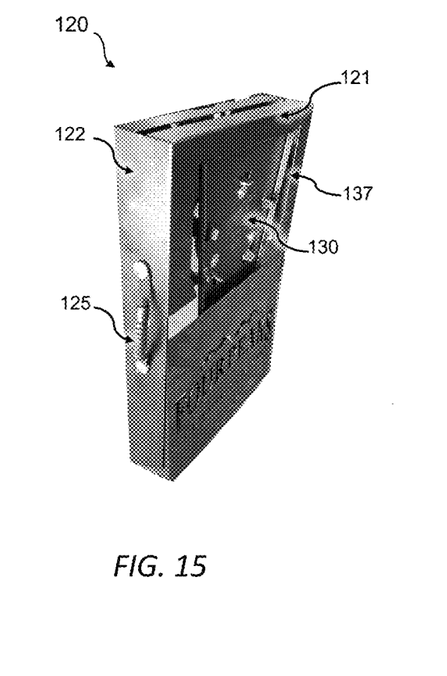
FIG. 15 illustrates a side view of the compactable and portable grill apparatus with first and second panels closed in relation to each other, in accordance with a preferred embodiment.
Figure 16:
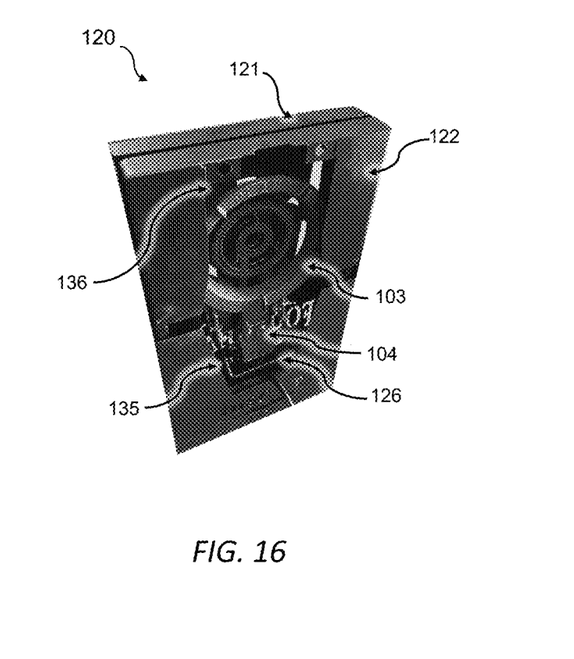
FIG. 16 illustrates a front left-side view of the compactable and portable grill apparatus depicted in FIG. 15, in accordance with a preferred embodiment.
Figure 17:
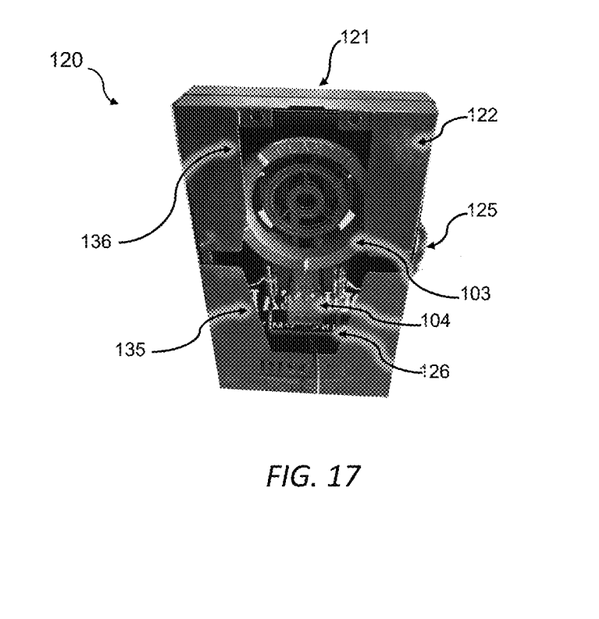
FIG. 17 illustrates a front view of the compactable and portable grill apparatus depicted in FIG. 2, in accordance with a preferred embodiment.

Referring to FIG. 3, levelers 118, roller 119, or a combination of these can be installed at the bottoms of the first and second support panels 121/122. Levelers 118 installed at the bottoms of the first and second support panels can facilitate leveling of the compactable portable grill apparatus on uneven ground. Rollers 119 installed at the bottoms of the first and second support panels can facilitate movement of the compactable portable grill apparatus on a ground.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A compactable portable grill apparatus, comprising:
a first support panel having a top, a bottom and a midsection;
a second support panel having a top, a bottom and a midsection;
a burner support panel having a first end and a second end;
at least one hinge coupled to the first end;
at least one spring-loaded post coupled to the second end; and
a handle coupled to the at least one spring-loaded post;
wherein the first support panel is connected at the midsection of the first support panel to the second panel at the midsection of the second support panel, thereby enabling scissor action and rotation of the first panel with respect to the second panel and collapsibility of the first panel closing against the second panel; and
wherein the burner support panel is hingedly connected by the hinge at the first end to the first support panel near the top of the first support panel and is also connectable near the top of the second support panel by operation of the at least one spring-loaded post located at the second end of the burner support panel, said at least one spring-loaded post configured to interface with at least one hole formed in the second support panel.

2. The compactable portable grill apparatus of claim 1, wherein said at least one spring-loaded post interfaces with the at least one hole formed in the second support panel via manipulation of a handle connected to the at least one spring loaded post.

3. The compactable portable grill apparatus of claim 1, wherein the first support panel and the second support panel comprise a two-part support system configured to support the burner support panel and the burner support panel is configured to support a burner and a cooking surface supported by burner on top of the burner support panel.

4. The compactable portable grill apparatus of claim 3, wherein the cooking surface is a wok.

5. The compactable portable grill apparatus of claim 4, wherein the fuel source is a propane tank.

6. The compactable portable grill apparatus of claim 1, further comprising a burner including a hose coupled to the burner and connectable to a fuel source, and a flame controller configured to control gas provided to the burner from the fuel source.

7. The compactable portable grill apparatus of claim 1, wherein the first and second support panels are in contact with the ground at their respective bottoms, and the burner panel is supporting a burner in a horizontal position between the tops of the first and second support panels when fully deployed.

8. The compactable portable grill apparatus of claim 1, further comprising rollers installed at the bottoms of the first and second support panels to facilitate movement of the compactable portable grill apparatus on a ground.

9. The compactable portable grill apparatus of claim 1, further comprising levelers installed at the bottoms of the first and second support panels to facilitate leveling of the compactable portable grill apparatus on uneven ground.

10. A compactable portable grill apparatus, comprising:
a first support panel having a top, a bottom and a midsection;
a second support panel having a top, a bottom and a midsection;
a burner support panel having a first end and a second end;
at least one hinge coupled to the first end;
at least one spring-loaded post coupled to the second end; and
a handle coupled to the at least one spring-loaded post;
wherein the first support panel is connected at the midsection of the first support panel to the second panel at the midsection of the second support panel, thereby enabling scissor action and rotation of the first panel with respect to the second panel and collapsibility of the first panel closing against the second panel; and wherein the first support panel and the second support panel comprise a two-part support system configured to support a burner support panel configured to support a burner and a cooking surface above the burner.

11. The compactable portable grill apparatus of claim 10, wherein the burner support panel is hingedly connected by a hinge at the first end to the first support panel near the top of the first support panel and is also connectable near the top of the second support panel.

12. The compactable portable grill apparatus of claim 11, wherein the burner support panel is connectable near the top of the second support panel by operation of the at least one spring-loaded post located at the second end of the burner support panel, said at least one spring-loaded post configured to interface with at least one hole formed in the second support panel via manipulation of a handle.

13. The compactable portable grill apparatus of claim 12, wherein the cooking surface is a wok.

14. The compactable portable grill apparatus of claim 4, wherein the fuel source is a propane tank.

15. The compactable portable grill apparatus of claim 1, further comprising a burner including a hose coupled to the burner and connectable to a fuel source, and a flame controller configured to control gas provided to the burner from the fuel source.

16. The compactable portable grill apparatus of claim 1, wherein the first and second support panels are in contact with the ground at their respective bottoms, and the burner panel is supporting a burner in a horizontal position between the tops of the first and second support panels when fully deployed.

17. The compactable portable grill apparatus of claim 1, further comprising rollers installed at the bottoms of the first and second support panels to facilitate movement of the compactable portable grill apparatus on a ground.

18. The compactable portable grill apparatus of claim 1, further comprising levelers installed at the bottoms of the first and second support panels to facilitate leveling of the compactable portable grill apparatus on uneven ground.

19. A compactable portable grill apparatus, comprising:
a first support panel having a top, a bottom and a midsection;
a second support panel having a top, a bottom and a midsection;
a burner support panel having a first end and a second end;
a burner mounted on the burner support panel and including a hose coupled to the burner that is connectable to a fuel source and a flame controller configured to control gas provided to the burner from the fuel source;
at least one hinge coupled to the first end of the burner support panel;
at least one spring-loaded post coupled to the second end of the burner support panel; and
a handle coupled to the at least one spring-loaded post;
wherein the first support panel is connected at the midsection of the first support panel to the second panel at the midsection of the second support panel, thereby enabling scissor action and rotation of the first panel with respect to the second panel and collapsibility of the first panel closing against the second panel; and
wherein the burner support panel hingedly connected by a hinge at the first end to the first support panel near the top of the first support panel and is also connectable near the top of the second support panel by operation of the at least one spring-loaded post located at the second end of the burner support panel, said at least one spring-loaded post configured to interface with at least one hole formed in the second support panel.

20. The compactable portable grill apparatus of claim 19, wherein at least one of the burner support panel and the burner are configured to support a cooking surface.

* * * * *